J. E. McLAUGHLIN.
PUNCTURE PROOF SHIELD FOR TIRES.
APPLICATION FILED DEC. 2, 1912.
1,133,486.
Patented Mar. 30, 1915.
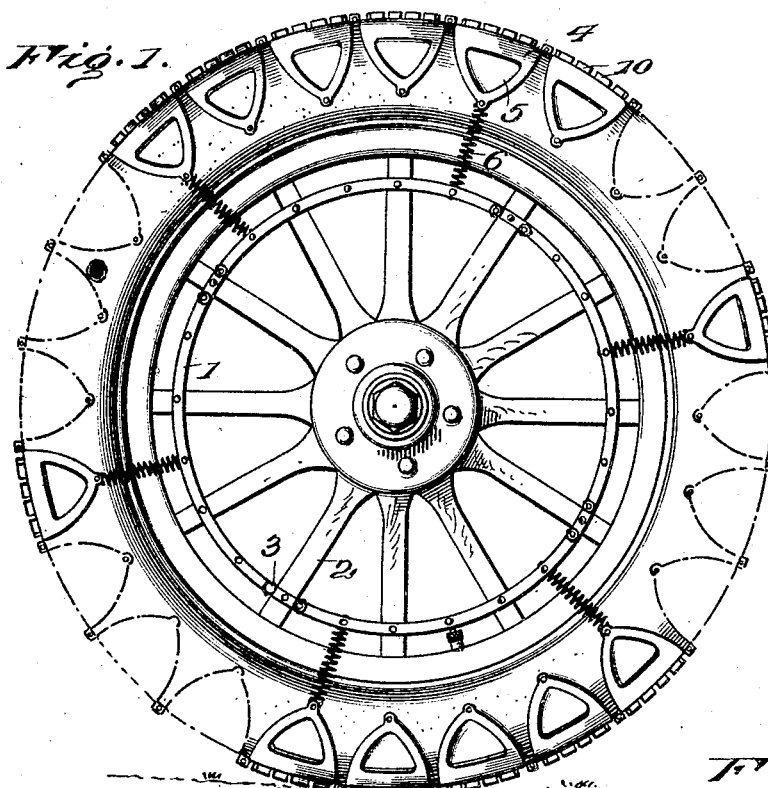
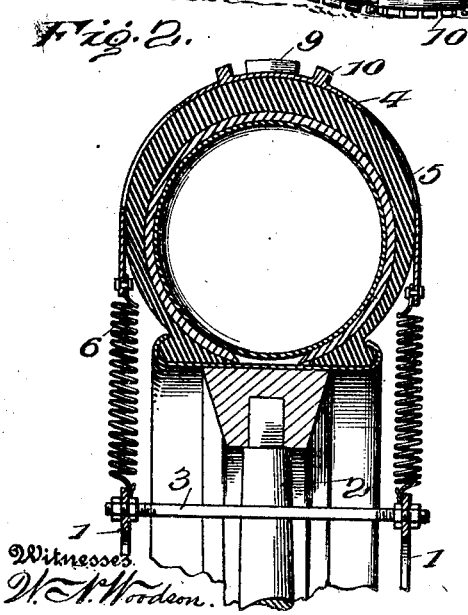
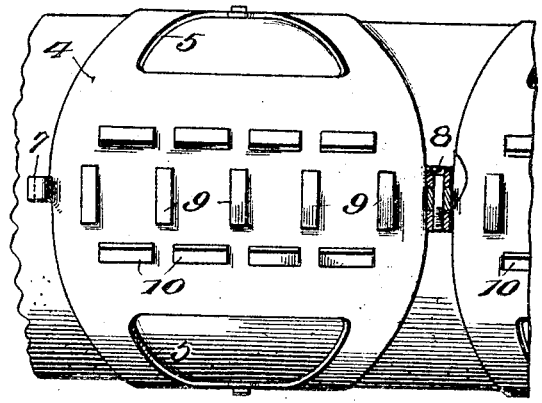
Inventor
J. E. McLaughlin
Witnesses
By
Attorneys

UNITED STATES PATENT OFFICE.

JAMES E. McLAUGHLIN, OF CHICAGO, ILLINOIS.

PUNCTURE-PROOF SHIELD FOR TIRES.

1,133,486.     Specification of Letters Patent.     Patented Mar. 30, 1915.

Application filed December 2, 1912. Serial No. 734,845.

*To all whom it may concern:*

Be it known that I, JAMES E. McLAUGHLIN, citizen of the United States, residing at Chicago, in the county of Cook and State of Illinois, have invented certain new and useful Improvements in Puncture-Proof Shields for Tires, of which the following is a specification.

This invention relates to puncture proof shields for tires, and has for its object to provide a simple and effective device which may be easily and quickly applied to a wheel having a resilient tire in such manner as to protect the tire against wear and puncture. With the above object in view the device includes rings which are held by bolts at opposite sides of the wheel. A series of metallic sections are pivotally connected together and extend around the periphery of a tire. These sections have end portions which extend along the opposite sides of the tire, and the inner ends of the said end portions are connected by means of springs with the said rings. The end portions of the sections are provided with openings, and the sections are provided upon their outer sides with tractors so disposed as to prevent the wheel from slipping or skidding in any direction.

For a full understanding of the invention, reference is to be had to the following description and accompanying drawings in which:

Figure 1 is a side elevation of a wheel with the shield applied; Fig. 2 is a transverse sectional view of part of the same; Fig. 3 is a plan view of parts of the shield with parts in section.

Corresponding and like parts are referred to in the following description and indicated in all the views of the accompanying drawings by the same reference characters.

The device includes holding rings 1 which are secured at the opposite sides of a wheel indicated at 2 by means of bolts 3 which pass through the rings at the opposite sides of the wheel and also pass through the spaces between the spokes of the wheel 2. These bolts are arranged in pairs, and the members of each pair are located one at each side of one of the spokes and they are in close contact with the same but not connected thereto; therefore the rings 1 are held against turning with relation to the wheel but are free to play laterally thereof. The shield proper is made up of a series of sections 4 of like dimensions and configuration. These sections are pivotally connected together, and a description of one will answer for all. The sections 4 are approximately U-shaped in edge elevation, and the end portions of the sections are provided with openings 5. Springs 6 connect the end portions of the sections 4 with the rings 1. As many or as few springs 6 may be employed as is necessary to hold the sections in position upon the tire of the wheel. Each section is provided at one edge with a single lug 7 and at its opposite edge with a pair of lugs 8. The single lug of one section is pivoted between the members of the pair of lugs of the next adjacent section so that all of these sections are pivotally connected together about the periphery of the wheel. Each section 4 is provided upon its outer side with a series of tractors 9 of uniform length, breadth and thickness, and disposed transversely across the vertical plane of the wheel 2, each section is furthermore provided with two sets of tractors 10. The tractors 10 are of uniform length, breadth and thickness, and the members of each set of tractors 10 are in longitudinal alinement with each other. The two sets of tractors 10 are disposed approximately parallel with the vertical plane of the wheel 2, and a set 10 is located beyond one end of the tractors 9, while the other set is disposed beyond the opposite end. The tractors 10 occur opposite the spaces between the tractors 9, and vice versa. The tractors 9 enable the wheel to stick or cling to a pavement when the wheel is turning in a forward or a rear direction, and the tractors 10 are to prevent the wheel from skidding or sliding sideways.

Inasmuch as the tractors 10 occur opposite the tractors 9, and vice versa, the wheel will move smoothly over the pavement and its center will at all times be held approximately at a uniform distance from the surface of the pavement.

It will be noted upon reference to Fig. 3 of the drawings that the sections of the shield are elliptical in form so that, while they protect the entire tread of the tire, they add no unnecessary weight thereto, and the adjacent edges of adjacent sections diverge from opposite sides of the tread portion thereby affording space between the adjacent sections to permit them to approach or recede from each other at their ends when the tire should happen to be partly deflected and thereby tend to assume a flat form in its contact with the ground. Inasmuch as the openings 5 are provided in the sections near both ends thereof, the sections will yield readily to an inflated tire and will also accommodate themselves to the tension of the retaining springs 6 when a tire is partly deflated. Inasmuch as each section is provided with a single hinge lug 7 on one edge and on the opposite edge with a pair of hinge lugs, the sections may be used interchangeably so that, if any section should happen to be broken or bent so as to be incapable of further use, a new section taken at random from stock may be substituted therefor, and it is unnecessary to maintain two reserve stocks to meet such emergency. The rings 1 are integral structures so that they will not tend to yield at one point and reduce the holding force exerted upon the shield but will remain concentric with the wheel throughout and, consequently, the springs 6 will be subjected to uniform strain. The rings 1 are disposed outside the planes of the rim of the wheel so that they are readily accessible for the purpose of fitting the device to a wheel or removing it therefrom, and the connecting bolts may be easily inserted through the rings.

Having described my invention, what is claimed as new is:

The combination with a wheel comprising a rim, spokes, and a pneumatic tire, of a shield for said tire consisting of elliptical sections adapted to fit transversely over the tire and each provided at one edge with a single hinge lug and at its opposite edge with a pair of hinge lugs adapted to receive between them the single hinge lug of an adjacent section and each section being provided in its tread portion with outstanding transversely and longitudinally disposed traction lugs and being further provided with openings near its ends and at opposite sides of the said lugs, pintles inserted through the engaging hinge lugs of adjacent sections, integral rings disposed adjacent the sides of the wheel, springs having their outer ends secured to the ends of some of the sections and their inner ends secured to said rings, and securing bolts inserted through said rings between the spokes of the wheel and bearing against the said spokes at opposite sides of the same.

In testimony whereof I affix my signature in presence of two witnesses.

JAMES E. McLAUGHLIN. [L. S.]

Witnesses:
  AUGUST GLASS,
  JOHN P. McLAUGHLIN.

Copies of this patent may be obtained for five cents each, by addressing the "Commissioner of Patents, Washington, D. C."